United States Patent
Sakai et al.

(10) Patent No.: US 12,055,742 B2
(45) Date of Patent: Aug. 6, 2024

(54) POLARIZATION DIFFRACTION ELEMENT AND VECTOR BEAM MODE DETECTION SYSTEM USING THE SAME

(71) Applicants: HAYASHI TELEMPU CORPORATION, Aichi (JP); NAGAOKA UNIVERSITY OF TECHNOLOGY, Niigata (JP); UNIVERSITY OF HYOGO, Hyogo (JP)

(72) Inventors: Takeya Sakai, Aichi (JP); Moritsugu Sakamoto, Niigata (JP); Hiroshi Ono, Niigata (JP); Nobuhiro Kawatsuki, Hyogo (JP)

(73) Assignees: HAYASHI TELEMPU CORPORATION, Aichi (JP); NAGAOKA UNIVERSITY OF TECHNOLOGY, Niigata (JP); UNIVERSITY OF HYOGO, Hyogo (JP)

(*) Notice: Subject to any disclaimer, the term of this patent is extended or adjusted under 35 U.S.C. 154(b) by 902 days.

(21) Appl. No.: 17/014,620

(22) Filed: Sep. 8, 2020

(65) Prior Publication Data

US 2021/0072447 A1    Mar. 11, 2021

(30) Foreign Application Priority Data

Sep. 10, 2019   (JP) .................. 2019-164405

(51) Int. Cl.
*G02B 5/32* (2006.01)
*C09K 19/38* (2006.01)
(Continued)

(52) U.S. Cl.
CPC ............ *G02B 5/32* (2013.01); *C09K 19/3852* (2013.01); *G01J 4/00* (2013.01); *G02B 27/0927* (2013.01);
(Continued)

(58) Field of Classification Search
CPC .......... G02B 5/32; G03H 1/0256; G03H 1/28; G03H 2001/0264; G03H 2001/0495;
(Continued)

(56) References Cited

FOREIGN PATENT DOCUMENTS

| JP | 2015094801 A | 5/2015 |
|----|--------------|--------|
| JP | 2018132500 A | 8/2018 |
| WO | 2016051443 A | 4/2016 |

OTHER PUBLICATIONS

Sakamoto et al (Polarization grating fabricated by recording a vector hologram between two orthogonally polarized vector vortex beams, JOSA B, vol. 34, No. 2, date: Jan. 4, 2017, pp. 263-269) (Year: 2017).*

(Continued)

*Primary Examiner* — Stephone B Allen
*Assistant Examiner* — Jyotsna V Dabbi
(74) *Attorney, Agent, or Firm* — Kagan Binder, PLLC

(57) ABSTRACT

A polarization diffraction element comprising including a film including a liquid crystalline material having photosensitivity, the film having at least one hologram recorded therein, and thereby having a property as a fork-shaped polarization grating having an anisotropic structure in which an optical axis continuously rotates toward a direction of a grating vector.

4 Claims, 16 Drawing Sheets

(51) Int. Cl.
  *G01J 4/00* (2006.01)
  *G02B 27/09* (2006.01)
  *G03H 1/02* (2006.01)
  *G03H 1/28* (2006.01)

(52) U.S. Cl.
  CPC ............. *G03H 1/0256* (2013.01); *G03H 1/28* (2013.01); *G03H 2001/0264* (2013.01); *G03H 2240/15* (2013.01); *G03H 2250/38* (2013.01); *G03H 2260/12* (2013.01)

(58) Field of Classification Search
  CPC ........... G03H 2240/15; G03H 2250/38; G03H 2260/12; G03H 1/0493; C09K 19/3852; G01J 4/00
  USPC .......................................................... 359/15
  See application file for complete search history.

(56) References Cited

OTHER PUBLICATIONS

Zhang et al (Optical superimposed vortex beams generated by integrated holographic plates with blazed grating, App. Phys. Lett. 111, 061901, date:Aug. 8, 2017) (Year: 2017).*
Sasaki et al (Photoalignment and resulting holographic vector grating formation in composites of low molecular weight liquid crystals and photoreactive liquid crystalline polymers, App. Phys. B, vol. 120, Date:May 14, 2015, pp. 217-222) (Year: 2015).*
Ndagano et al (Creation and detection of vector vortex modes for classical and quantum communication, J. lightwave tech., vol. 36, No. 2, Date:Jan. 15, 2018, pp. 292-301) (Year: 2018).*
Li et al (Controlling orbital angular momentum using forked polarization gratings, Proc. SPIE, vol. 7789, date Aug. 16, 2010, pp. 1-12 (Year: 2010).*
Sakamoto et al., "Mode sorting of vector beams by use of forked polarization gratings", Abstract from Proceedings (Extended Abstracts) of Optics & Photonics Japan 2018 (Oct. 30 to Nov. 2, Tsukuba), published on Oct. 24, 2018, with machine English translation, (8 pages).
Sakamoto et al., "Generation and detection of optical vortices and vector beams by use of liquid crystal polarization grating", Abstract from Proceedings of 2019 IEICE General Conference (Mar. 19 to 22, 2019, Tokyo), published (on web) on Mar. 11, 2019, with machine English translation, (3 pages).
JP Notice of Reasons of Refusal, and English Translation thereof, for JP Application No. 2019-164405, dated Mar. 22, 2023, (6 pages).
Sakamoto et al., "Mode demultiplexing of vector beams using crossed-fork-shaped polarization grating fabricated by photoalignment of photo-crosslinkable liquid crystal polymer," Applied Physics Letters, 115, 061104, Aug. 7, 2019, (6 pages). (See Notice of Reasons of Refusal for JP 2019-164405).
Li et al., "Orbital angular momentum generation and mode transformation with high efficiency using forked polarization gratings", vol. 51, No. 34, pp. 8236-8245, 2012, (10 pages).

* cited by examiner

POLARIZATION DIFFRACTION ELEMENT AND VECTOR BEAM MODE DETECTION SYSTEM USING THE SAME

CROSS REFERENCE TO THE RELATED APPLICATION

This application is based on and claims Convention priority to Japanese patent application No. 2019-164405, filed Sep. 10, 2019, the entire disclosure of which is herein incorporated by reference as a part of this application.

BACKGROUND OF THE INVENTION

Field of the Invention

The present invention relates to an optical element (polarization diffraction element) having a property of a polarization diffraction grating (hereafter referred to as polarization grating) and an optical system using the same element, and particularly to a vector beam mode detection system using the polarization diffraction element.

Description of Related Art

In accordance with recent demands for large-capacity transmission technology in the field of information communication, various optical multiplex communication technologies such as wavelength-division multiplex communication and polarization-division multiplex communication have been developed. However, the upper limit of the communication capacity is technically reaching the ceiling. In order to overcome this limitation, attention has recently been focused on space-division optical multiplex communication using topological lightwaves such as optical vortexes and vector beams.

In optical multiplex communication using topological lightwaves, information is multiplexed by utilizing the orthogonality of spatial mode (so-called transverse mode) of light. Theoretically speaking, since there can be an infinite number of mode indices for topological lightwaves, there is no upper limit to the multiplexing capacity. Therefore, there are high expectations for optical multiplex communication using topological lightwaves as an optical communication technology of next-generation.

One example of the lightwaves that belong to topological lightwaves is vector beams. Vector beams are lightwaves having a spatial distribution of polarization. When vector beams are used for space-division optical multiplex communication, stable transmission in a multimode fiber is enabled since the vector beams are waveguided mode in the fiber. Furthermore, even when vector beams have the same order, orthogonal polarization modes exist, so that a large amount of information can be handled. Therefore, it is possible to solve the problem of limitation of communication capacity in the conventional technology.

Optical vortexes are lightwaves that belong to topological lightwaves. The optical vortexes are lightwaves having an equiphase surface with a spiral shape around a predetermined axis (usually, an optical axis), and propagate while maintaining the orbital angular momentum, so that force can be applied within the equiphase wave front. Therefore, the optical vortexes can be applied to optical tweezers that trap fine particles, and optical processing. Further, since the optical vortexes are scalar waves, the parameters as lightwaves are independent of the polarization state, so that increase of the amount of information in optical communication by combining the optical vortex mode and the polarization state is expected.

It is known to use a fork-shaped polarization grating having an edge dislocation shape as a means for generating optical vortexes. For example, WO2016/051443 described that spiral waves can be generated by using a polarization grating including edge dislocation in the grating plane, and irradiating light or particle beam to the grating.

Li et al., 2012 (Yanming Li, Jihwan Kim, and Michael J. Escuti, Orbital angular momentum generation and mode transformation with high efficiency using forked polarization gratings, APPLIED OPTICS, Vol. 51, No. 34, p8236-8245.) described that a fork-shaped polarization grating (FPG) formed in a liquid crystalline material can be used to convert Gaussian beams to spiral waves in the visible light range.

In order to increase the amount of information in optical communication by using topological light such as vector beams or optical vortexes, it is necessary to simultaneously transmit light having different modes and separate the light for each mode on the receiving side. Therefore, it is required to to develop a simple means for multiplexing vector beams or optical vortexes and for detecting the modes of the vector beams or optical vortexes.

WO2016/051443 and Li et al., 2012 indicated that a fork-shaped polarization grating can be used for generating optical vortexes. However, a means for detecting the modes of vector beams anf a method or means for multiplexing vector beams or optical vortexes are not described in these documents.

An object of the present invention is to provide a polarization diffraction element having a property (in other words, having an optical structure) of a fork-shaped polarization grating that can be used to generate topological light, and that can be imparted characteristics as a plurality of polarization gratings by a simple method as necessary. Another object of the present invention is to provide a vector beam mode detection system including the polarization diffraction element, and a method for using the polarization diffraction element.

DISCLOSURE OF THE INVENTION

A polarization diffraction element according to the present invention is a polarization diffraction element including
  a film including a liquid crystalline material having photosensitivity,
  the film having at least one hologram recorded therein,
  and thereby having a property as a fork-shaped polarization grating having an anisotropic structure in which an optical axis continuously rotates toward a direction of a grating vector.

In the polarization diffraction element having the above configuration, topological charges with ±m can be applied to ±1st-order diffracted light in accordance with a branch number m of a fork of the fork-shaped polarization grating.

The above-described polarization diffraction element may have a plurality of polarization holograms recorded (multi-recorded) in the film, where each of the polarization holograms has a property as a fork-shaped polarization grating, and the direction of the grating vector and a topological charge applied to diffracted light are different from each other.

The polarization diffraction element can emit diffracted lights in different directions, where each of the diffracted lights is applied with different topological charge to the incident light (incident beam). Therefore, the polarization diffraction element can be used in various applications including mode detection of vector beam, generation of an optical vortex array, generation of a vector beam multiplex state, and detection of an optical vortex/polarization multiplex state.

In the above-described polarization diffraction element, the liquid crystalline material may include at least a polymer that includes a photosensitive group in at least a part of side chains and that has a side chain represented by any one of the following chemical formulas 1 to 3.

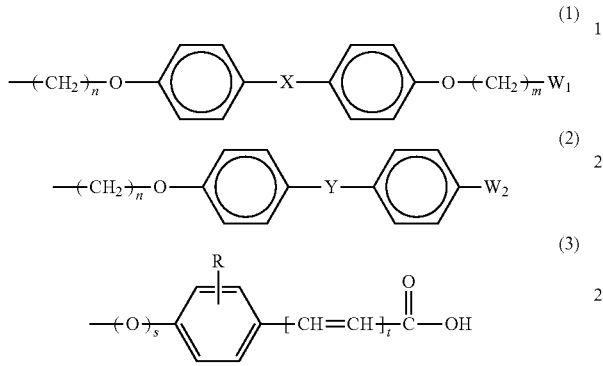

In each of the chemical formulas 1 and 2, n independently represents an integer of 1 to 12, m independently represents an integer of 1 to 12, X and Y each represent none, —COO, —OCO—, —N=N—, —C=C—, or —$C_6H_4$—, and $W_1$ and $W_2$ each represent a cinnamoyloxy group, a chalcone group, a cinnamylidene group, a biphenylacryloyloxy group, a furylacryloyloxy group, a naphthylacryloyloxy group or a derivative thereof, —H, —OH, or —CN. In the chemical formula 3, s represents 0 or 1, t represents an integer of 1 to 3, and R represents H, an alkyl group, an alkyloxy group, or a halogen.

The polarization diffraction element can be produced by a simple method using the above described liquid crystalline material.

A second aspect of the present invention is directed to a vector beam mode detection system including:
the above-described polarization diffraction element;
single-mode optical fibers having light-incident end faces located in ±1st-order diffraction directions of a polarization grating formed by at least one polarization hologram recorded in the polarization diffraction element; and
a photodetector configured to detect light guided through the single-mode optical fibers, wherein
light converted to Gaussian beam by the polarization diffraction element is detected through the single-mode optical fibers, thereby detecting a mode of a vector beam incident on the polarization diffraction element.

When this system is used, only a vector beam having a predetermined mode is converted to Gaussian beam using a predetermined hologram, and thus it is possible to detect the mode of an incident vector beam, which can contribute to the realization of optical communication using the vector beam.

A third aspect of the present invention is directed to a method for producing the above polarization diffraction element, the method including:

forming a coating film including the liquid crystalline material having photosensitivity;
recording a polarization hologram having a property as a fork-shaped polarization grating in the coating film by irradiating the coating film with an optical vortex having circular polarization and Gaussian beam having circular polarization with a rotation direction reversal to that of the optical vortex; and
curing the coating film, wherein
a plurality of holograms is recorded (multi-recorded) in the coating film, such that a topological charge applied by a fork-shaped polarization grating of each of the holograms and a direction of a grating vector of the fork-shaped polarization grating are different from each other.

According to this method, it is possible to provide the polarization diffraction element according to the present invention by a simple method.

A fourth aspect of the present invention is directed to a method for using the polarization diffraction element in which the plurality of polarization holograms is multi-recorded.

The method may be a vector beam mode detection method including converting a vector beam incident on the polarization diffraction element to Gaussian beam by any one of the plurality of polarization holograms, thereby detecting a mode of the vector beam. In this method, the plurality of polarization holograms applies different topological charges, and thus it is possible to detect the mode of an incident vector beam by specifying a polarization hologram that converts the incident light to Gaussian beam.

Alternatively, the above method may be an optical vortex generation method including
causing circularly polarized light or linearly polarized light to be incident on the polarization diffraction element, thereby emitting a plurality of optical vortexes having different topological charges in ±1st-order diffraction directions of the plurality of polarization holograms. In this method, a plurality of optical vortexes having different topological charges can be arranged two-dimensionally, which has high applicability in the fields of optical tweezers and optical processing.

Still alternatively, the above method may be a method for generating a vector beam in a multiplex state, the method including causing an optical vortex having right-handed circular polarization and an optical vortex having left-handed circular polarization to be incident on the polarization diffraction element from ±1st-order diffraction directions of the plurality of polarization holograms, and coherently superimposing the optical vortexes, thereby emitting a multiplex vector beam in which vector beams having different modes are multiplexed. In this method, a multiplex state of a vector beam can be formed. Thus, the method can contribute to the realization of optical communication using a vector beam in combination with the above vector beam mode detection system or mode detection method.

The above method may be a method for detecting an optical vortex/polarization multiplex state, the method including detecting a combination state of a mode of an optical vortex and a rotation direction of circularly polarized light on the basis of a topological charge applied to light incident on the above polarization diffraction element, and a diffraction direction. This method can be used for optical vortex multiplex communication.

In the present invention, by recording a hologram in the film comprising the liquid crystalline material having photosensitivity, it is possible to form a polarization diffraction element that constitutes a fork-shaped polarization grating (FPG) having an anisotropic structure in which an optical axis continuously rotates toward a direction of a grating vector. It is possible to record a plurality of holograms in the polarization diffraction element by a simple method, and thus it is possible to provide an unprecedented polarization diffraction element including one film that has functions of a plurality of FPGs each having different directions of grating vectors and different topological charges.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

The polarization diffraction element according to the present invention is a polarization diffraction element that includes a film comprising a liquid crystalline material having photosensitivity, wherein the film has an optical structure of at least one fork-shaped polarization grating by at least one hologram recorded in the film. Each of the fork-shaped polarization grating has an anisotropic structure in which an optical axis continuously rotates toward a direction of a grating vector.

Figure 1:
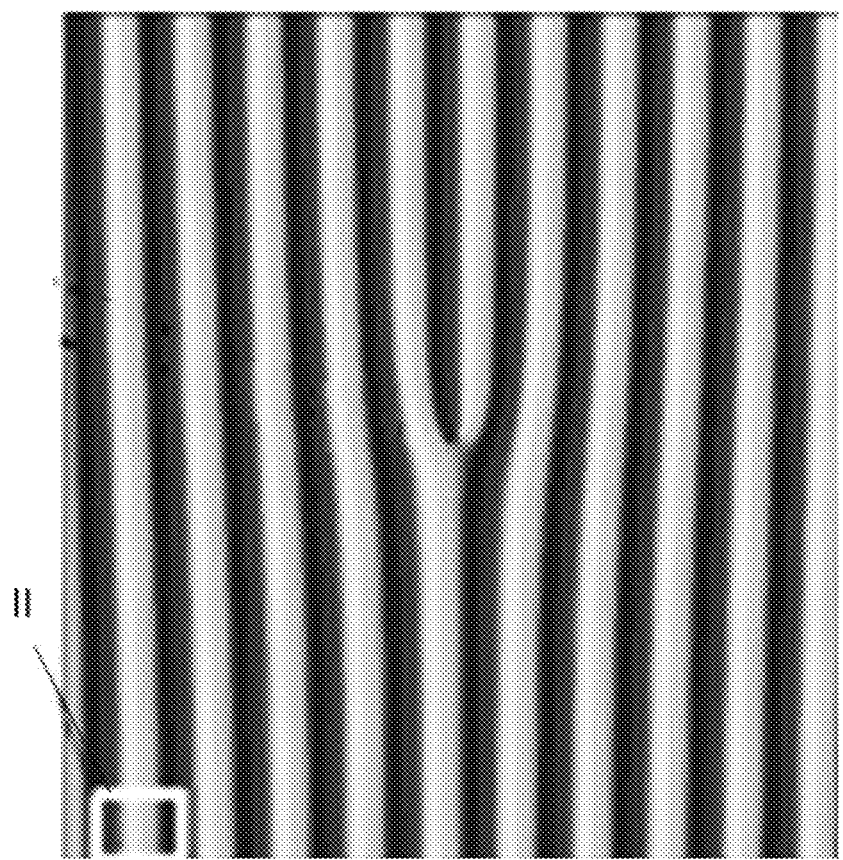
FIG. 1 is a diagram showing a distribution of an optical axis direction in a fork-shaped polarization grating that is a polarization diffraction element according to an embodiment of the present invention.

The present invention is characterized by using a special optical element called a polarization grating (PG) having a spatial distribution of optical anisotropy. FIG. 1 is a conceptual diagram showing a distribution of an optical axis direction in the polarization grating used in the present invention. The polarization grating is referred to as a fork-shaped PG (FPG) because of its spatial distribution of optical anisotropy.

Figure 2A:
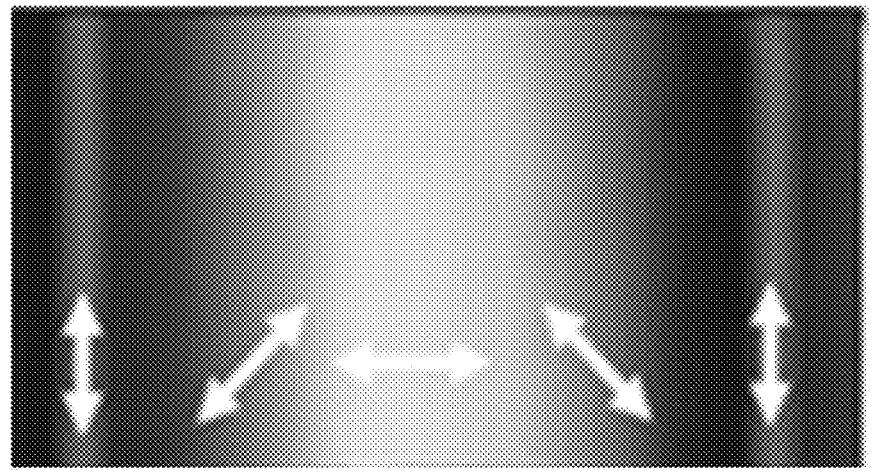
FIG. 2A is a diagram showing an optical axis direction in a portion indicated by II in FIG. 1.

In the polarization grating, parts where the directions of optical axes are parallel to each other are distributed at predetermined intervals in a grating (grid) shape. In the parts shown bright in FIG. 1, the directions of the optical axes are substantially perpendicular to the grating (the lateral direction in the drawing). A vector connecting the parallel parts of the grating is defined as a grating vector. FIG. 2A is an enlarged view of a portion indicated by a frame II in FIG. 1. In FIG. 2A, white arrows show how the direction of the optical axis rotates relative to the grating vector, but the direction of the optical axis rotates continuously.

Figure 2B:
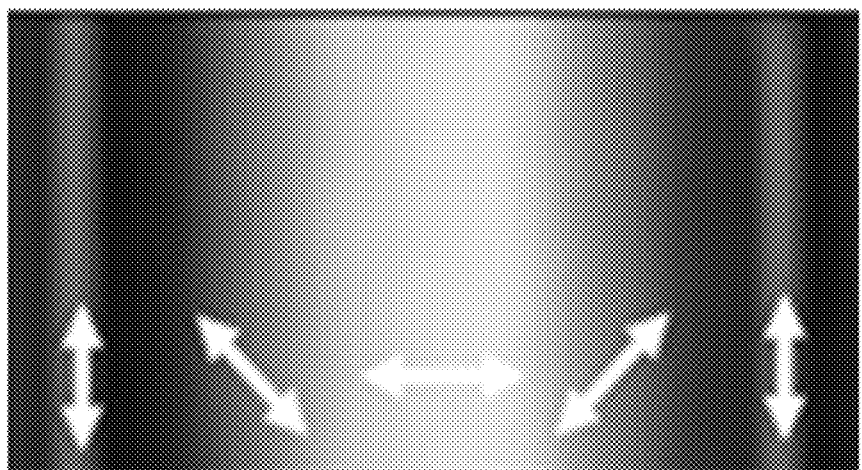
FIG. 2B is a diagram corresponding to FIG. 2A and showing a distribution of an optical axis direction in a Type-II FPG.
Figure 3A:
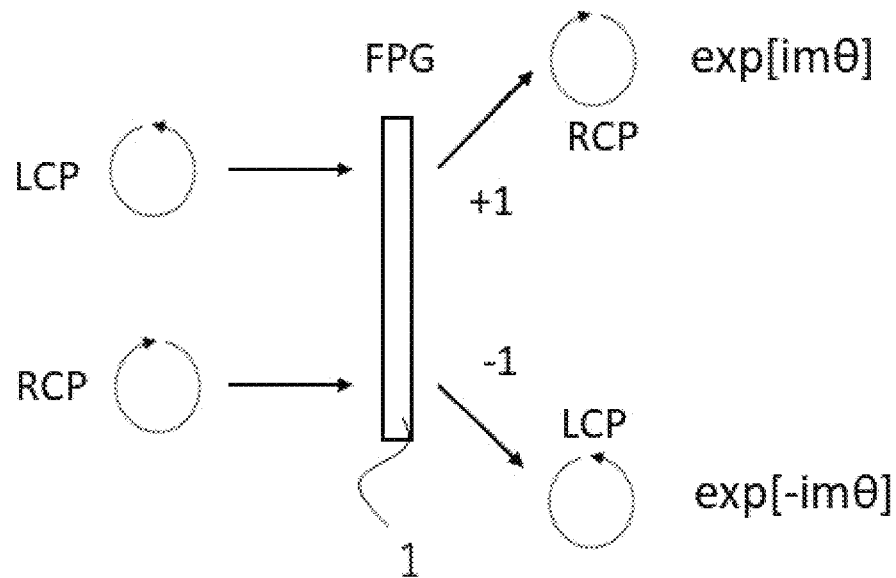
FIG. 3A is a diagram for describing diffracted light in the case where circularly polarized light is transmitted through a Type-I FPG.
Figure 3B:
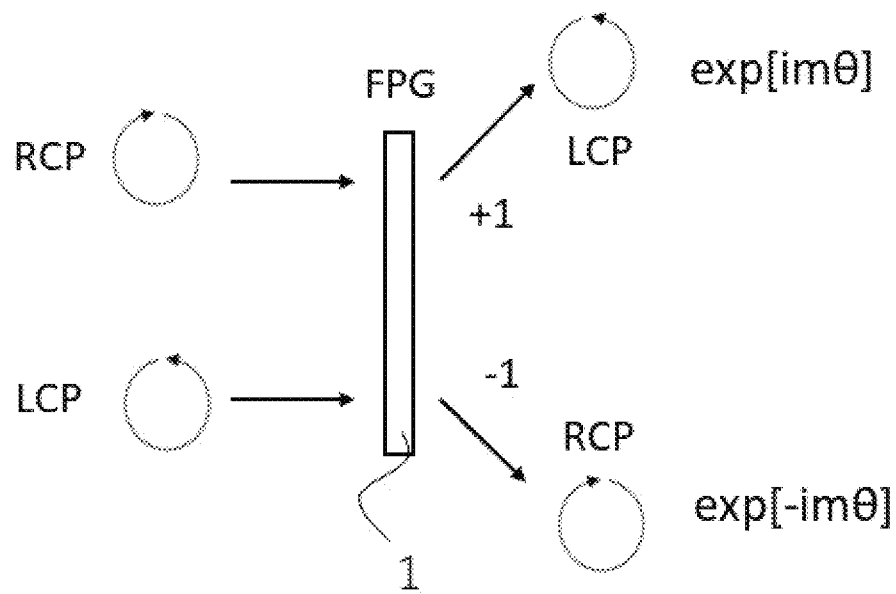
FIG. 3B is a diagram for describing diffracted light in the case where circularly polarized light is transmitted through the Type-II FPG.

At the center of the optical element, there is a branch point of the equi-direction line (linear portion with the same optical direction) of the optical axis direction, and the number m of the equi-direction lines increasing at this branch point is involved in a topological charge applied by the optical element. Such optical elements (FPGs) include an optical element in which the direction of the optical axis rotates clockwise relative to the direction of the grating vector as shown in FIG. 2A, and an optical element in which the direction of the optical axis rotates counterclockwise relative to the direction of the grating vector as shown in FIG. 2B. Hereinafter, the former is referred to as a Type-I FPG, and the latter is referred to as a Type-II FPG FIGS. 3A and 3B are each a diagram for describing the case where circularly polarized light is transmitted through a polarization diffraction element 1 having the characteristics of a fork-shaped polarization grating (FPG). When circularly polarized light is transmitted through the FPG, a geometric phase corresponding to the direction of the optical axis occurs spatially. For example, in the case where the polarization diffraction element 1 is the Type-I FPG shown in FIG. 1, when incident light has left-handed circular polarization (LCP), the light is diffracted in a +1st-order direction, and at the same time, a spiral phase term of $\exp[+im\theta]$ (topological charge of +m) is applied, so that the light becomes an optical vortex having right-handed circular polarization. When incident light has right-handed circular polarization (RCP), the light is diffracted in a −1st-order direction, and at the same time, a spiral phase term of $\exp[-im\theta]$ (topological charge of −m) is applied, so that the light becomes an optical vortex having left-handed circular polarization.

In the case where the polarization diffraction element 1 is the Type-II FPG, as shown in FIG. 3B, the direction of diffraction and the sign of the spiral phase term (topological charge) applied are inverted from those in the case of the Type-I FPG That is, when incident light has left-handed circular polarization (LCP), the light is diffracted in the −1st-order direction, and at the same time, a spiral phase term of $\exp[-im\theta]$ (topological charge of −m) is applied, so that the light becomes an optical vortex having right-handed circular polarization. When incident light has right-handed circular polarization (RCP), the light is diffracted in the +1st-order direction, and at the same time, a spiral phase term of $\exp[+im\theta]$ (topological charge of +m) is applied, so that the light becomes an optical vortex having left-handed circular polarization.

In the polarization diffraction element according to the present invention, by recording a hologram in a film comprising a liquid crystalline material having photosensitivity, characteristics as a fork-shaped polarization grating is imparted to the film. In this case, by adjusting the hologram to be recorded, the Type-I FPG or the Type-II FPG can be produced. Furthermore, the number m of the equi-direction lines increasing at the branch point of the FPG can be selected. Thus, the topological charge applied by the FPG can be selected.

In the present invention, it has further been found that, by multi-recording holograms in a film comprising a liquid crystalline material having photosensitivity, the functions of a plurality of FPGs having different characteristics as a polarization grating can be imparted to one optical element.

For example, a Type I FPG with m=2 is referred to as a grating A, a Type II FPG with m=2 is referred to as a grating B, a Type I FPG with m=1 is referred to as a grating C, and a Type II FPG with m=1 is referred to as a grating D. When holograms for forming the gratings A, B, C, and D are recorded in one film while the direction of a grating vector is changed in steps of 45°, the +1st-order and −1st-order diffraction directions of each grating are projected at different positions (as viewed from the incident direction) as indicated by $A_+$, $A_-$, $B_+$, $B_-$, $C_+$, $C_-$, $D_+$, and $D_-$ in FIG. 4. When such a polarization diffraction element 1 (crossed fork-shaped polarization grating: Crossed-FPG) is used, the incident light can be converted to topological light having different characteristics in each diffraction direction. In addition, by detecting diffracted light in each diffraction direction, the polarization diffraction element 1 can also be used to determine the properties of the incident light.

[Vector Beam Mode Detection System]

Hereinafter, a vector beam mode detection method and vector beam mode detection system using the polarization diffraction element 1 according to the present invention will be described.

Figures 5, 6:
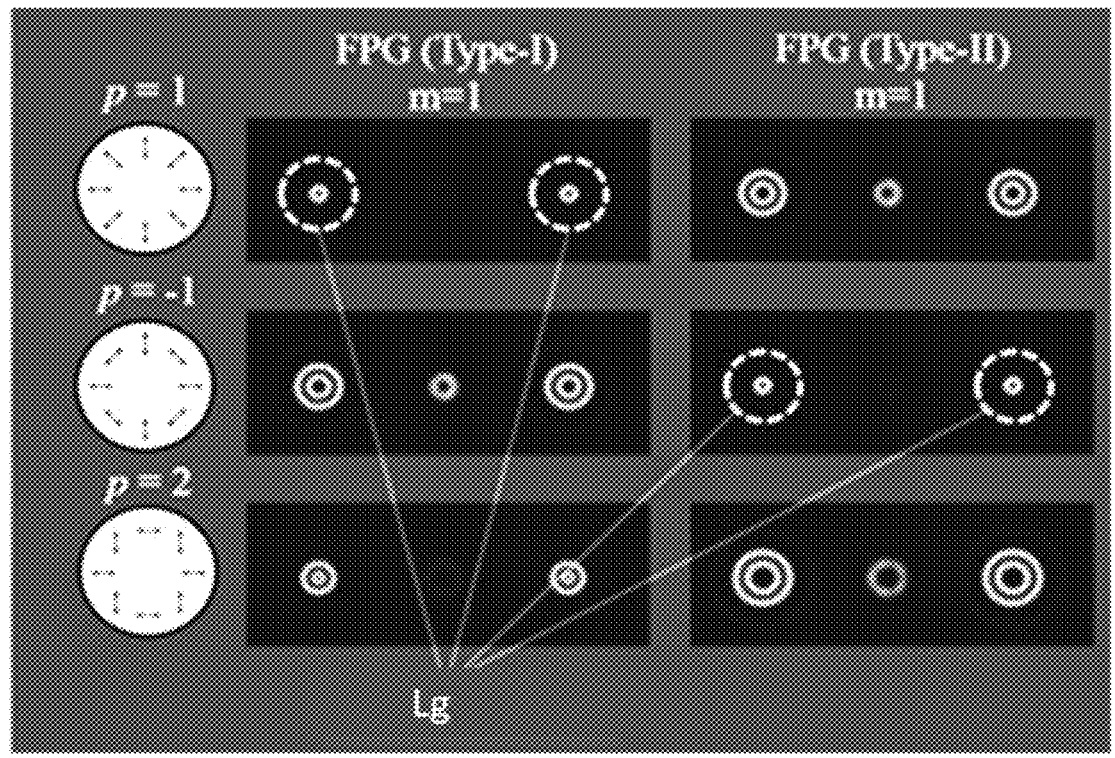
FIG. 5 is a diagram showing that a vector beam is formed from a combination of coherent optical vortexes.
FIG. 6 is a diagram showing the relationship between the order of vector beam and generation of Gaussian beam by correspondence of topological charge applied by the FPGs.

As shown in FIG. 5, a vector beam having linear polarization (radial polarization) can be regarded as being in a coherent superposition state of left-handed circular polarization (LCP) and right-handed circular polarization (RCP) having topological charges having absolute values equal to each other and opposite signs (that is, can be regarded as a superposition of an optical vortex having left-handed circular polarization and an optical vortex having right-hand circular polarization). When the amount of rotation of the polarization direction around the optical axis of a vector beam is defined as p, the vector beam is a coherent superposition of LCP having a spiral phase term of $\exp[-ip\theta]$ and RCP having a spiral phase term of $\exp[+ip\theta]$. Here, when a vector beam with p>0 is passed through a Type-I FPG (branch number: m), the topological charges of ±1st-order light are converted to $\exp[i(m-p)\theta]$ (+1st-order light) and $\exp[i(p-m)\theta]$ (−1st-order light). Therefore, when a relationship of |p|=m (p>0) is satisfied, the vector beam transmitted through the Type-I FPG is diffracted in the ±1st-order diffraction directions as Gaussian beam (the topological charge is 0). On the other hand, when p and m are different, the topological charge remains in the diffracted light, and the diffracted light has characteristics as an optical vortex.

On the other hand, a vector beam with p<0 can be converted to Gaussian beam by a Type-II FPG When a vector beam having an order p is passed through a Type-II FPG, the topological charges of ±1st-order light are converted to $\exp[i(m+p)\theta]$ (+1st-order light) and $\exp[-i(p+m)\theta]$ (−1st-order light). Therefore, in the Type-II FPG, only a vector beam satisfying the relationship of |p|=m (p<0) is diffracted as Gaussian beam in the ±1st-order light directions.

For example, FIG. 6 is a diagram showing simulation results of the intensity distribution of diffracted light when vector beams having different orders are passed through the Type-I (m=1) FPG and the Type II (m=1) FPG The complex amplitude distributions of the vector beams transmitted through the Type-I (m=1) and Type II (m=1) FPGs having anisotropic distributions are obtained by Jones matrix calculation, and Fraunhofer diffraction images are calculated by performing Fast Fourier transform on the calculated complex amplitude distributions. FIG. 6 shows the Fraunhofer diffraction images thus obtained for each order of the vector beams. In each diffraction image, the left side shows the intensity distribution of the diffracted light in the +1st-order direction, and the right side shows the intensity distribution of the diffracted light in the −1st-order direction. It is found that only when the above-described relationship between p and m is satisfied, ±1st-order light is converted to Gaussian beam (Gaussian beam Lg). The spot (small circle) at each center portion corresponds to 0th-order light, and, in principle, the value can be made zero by matching the retardation of the FPG with π (that is, the diffraction efficiency of ±1st order light can be 100%).

Figure 7A:
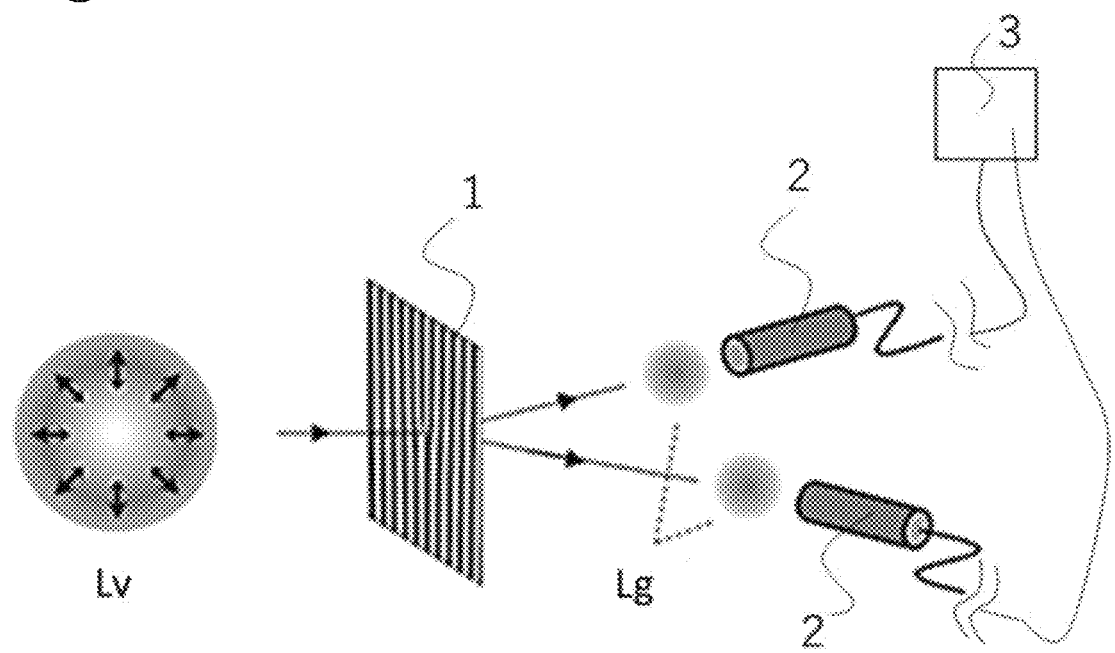
FIGS. 7A and 7B are diagrams for describing a vector beam mode detection system according to an embodiment of the invention.
Figure 7B:
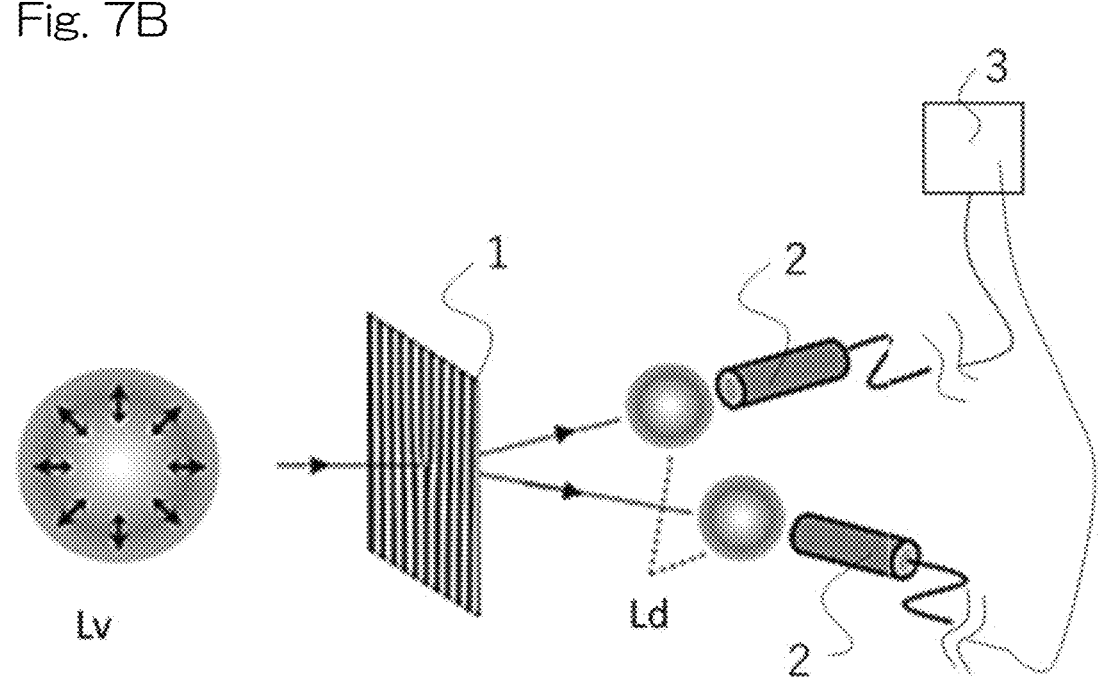

FIGS. 7A and 7B are each a schematic diagram showing a vector beam mode detection system using the above principle. This system includes the polarization diffraction element (FPG) 1 according to the present invention, single-mode optical fibers 2 having light-incident end faces located in ±1st-order diffraction directions of a polarization grating (FPG) formed by at least one polarization hologram recorded in the polarization diffraction element, and a photodetector 3 that detects light guided in the single-mode optical fibers 2. As shown in FIG. 7A, when Gaussian beams Lg are incident on the optical fibers 2, the Gaussian beams are guided and detected by the photodetector 3. However, as shown in FIG. 7B, when the topological charge does not become zero, a vector beam Lv is converted to doughnut-shaped optical vortexes Ld which are not guided in the optical fibers 2. Thus, the incident beam is not detected.

For example, in the case where the polarization diffraction element 1 has the property of the Type-I (branch number: m) FPG, if the incident beam includes a vector beam Lv with $|p|=m$ (p>0), the incident beam is detected by the photodetector 3. In addition, in the case where the polarization diffraction element 1 has the characteristics of the Type II (branch number: m) FPG, if the incident beam includes a vector beam Lv with $|p|=m$ (p<0), the incident beam is detected by the photodetector 3.

Figure 4:
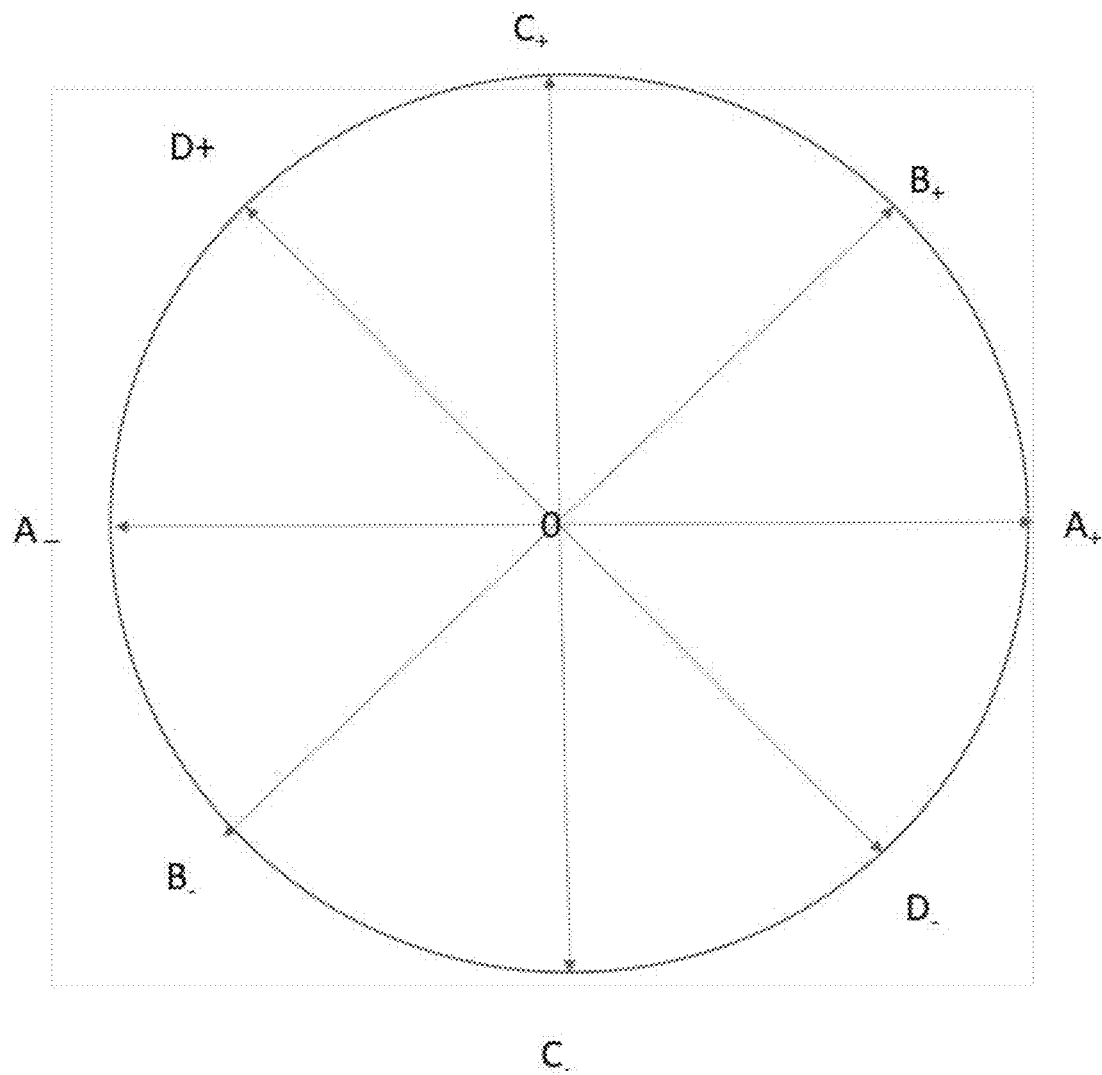
FIG. 4 is a diagram for showing the distribution of the 1st-order diffraction direction of each FPG in a polarization diffraction element (Crossed-FPG) in which holograms for FPGs are multi-recorded while changing the direction of a grating vector in steps of 45° as an embodiment of the present invention.

When the polarization diffraction element described with reference to FIG. 4 is used, in the case of a vector beam with p=1, the diffracted light becomes Gaussian beam in the diffraction directions $C_+$ and $C_-$. Similarly, a vector beam with p=2 is diffracted as Gaussian beam in the diffraction directions $A_+$ and $A_-$, a vector beam with p=−1 is diffracted as Gaussian beam in the diffraction directions $D_+$ and $D_-$, and a vector beam with p=−2 is diffracted as Gaussian beam in the diffraction directions $B_+$ and $B_-$. Therefore, when the single-mode optical fibers 2 shown in FIGS. 7A and 7B are installed in the respective diffraction directions to identify the optical fiber through which the incident beam is detected by the photodetector 3, it is possible to determine the mode of the vector beam included in the incident beam. In this manner, whether a vector beam having a desired order is included in incident beam on the FPG can be determined.

[Element for Optical Vortex Generation, Method for Generating Optical Vortexes]

As shown by the doughnut-shaped intensity pattern in FIG. 6, light that is not converted to Gaussian beam Lg when diffracted by the polarization diffraction element according to the present invention is diffracted as optical vortexes. Therefore, the polarization diffraction element according to the present invention can also be used as an element for generating optical vortexes (optical vortex generator), and optical vortexes can be generated by using this element.

When linearly polarized light is caused to be incident on the polarization diffraction element 1 according to the present invention, optical vortexes are generated in the ±1st-order diffraction directions. In addition, as shown in FIGS. 3A and 3B, when left-handed circularly polarized light or right-handed circularly polarized light is caused to be incident on the polarization diffraction element 1, an optical vortex having circular polarization is generated in the +1st-order or −1st-order diffraction direction in accordance with the rotation direction of polarized light. When the element described with reference to FIG. 4 is used, optical vortexes having different intensity distributions can be generated in different directions, and an array of optical vortexes arranged two-dimensionally can be obtained. Such an optical vortex array is highly useful for optically trapping fine particles at multiple points and optically processing metals.

[Vector Beam Multiplex State Generation Element And Vector Beam Multiplex State Generation Method]

Figure 8:
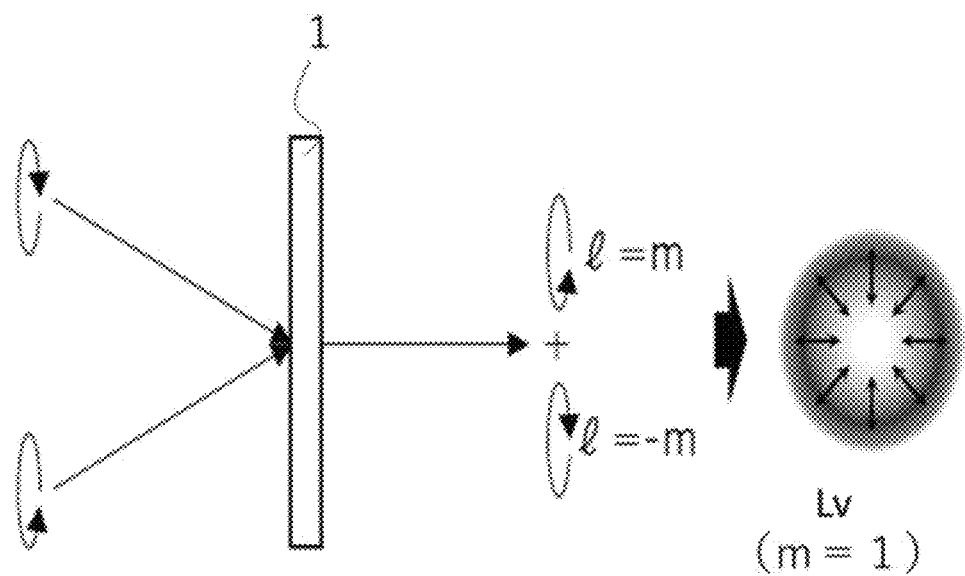
FIG. 8 is a diagram showing a state of generating a vector beam using the polarization diffraction element according to the embodiment of the present invention.

The polarization diffraction element 1 according to the present invention can also be used for generating a multiplex state of vector beams. As shown in FIG. 8, when left-handed circularly polarized light and right-handed circularly polarized light that are coherent to each other are caused to be simultaneously incident from the directions corresponding to the diffraction angle of the FPG, the emitted light becomes a vector beam Lv by coherent superposition of an optical vortex having right-handed circular polarization and an optical vortex having left-handed circular polarization. Here, when the polarization diffraction element 1 having an optical structure of crossed FPG described with reference to FIG. 4 is used, by causing a plurality of pairs of coherent left-handed circularly polarized light and right-handed circularly polarized light to be incident on the polarization diffraction element (crossed FPG) 1 from diffraction directions for each pair such that topological charges applied to the incident lights are different from each other, it is possible to generate vector beams Lv having different modes in the same emission direction, thereby causing a multiplex state of vector beams Lv having different modes.

[Optical Vortex/Polarization Multiplex State Detection Element and Detection Method]

Optical vortexes are scalar lightwaves, and the parameters as lightwaves are independent of the polarization state. Thus, it is possible to combine multiplexing of optical vortexes and multiplexing of polarization. Since the sign of the diffraction order differs depending on the rotation direction of circularly polarized light incident on the FPG, a combination state of an optical vortex and circular polarization can be detected on the basis of a combination of the value of m of the FPG and the sign of the diffraction order. Therefore, the polarization diffraction element according to the present invention can also be used as a detection element for optical vortex multiplex communication.

[Method for Producing Polarization Diffraction Element]

As described above, the polarization diffraction element according to the present invention is useful for realizing optical multiplex communication using topological lightwaves such as vector beams and optical vortexes. In the present invention, the polarization diffraction element can be produced by the following steps using a liquid crystalline material having a photosensitive group.

(Step 1) A step of forming a coating film made of a liquid crystalline material having photosensitivity.

(Step 2) A step of recording, at least once, a polarization hologram having characteristics as a fork-shaped polarization grating by irradiating the coating film with an optical vortex having circular polarization and interference light having circular polarization with a rotation direction that is reversal to that of the optical vortex.

(Step 3) A step of curing (hardening) the coating film.

Particularly, in the present invention, in the above Step 2, a plurality of holograms is preferably multi-recorded (over-recorded) in the coating film such that the topological charge applied by each of the fork-shaped polarization grating and the direction of the grating vector are different are from each other.

[Hologram Recording Device]

Figure 9:
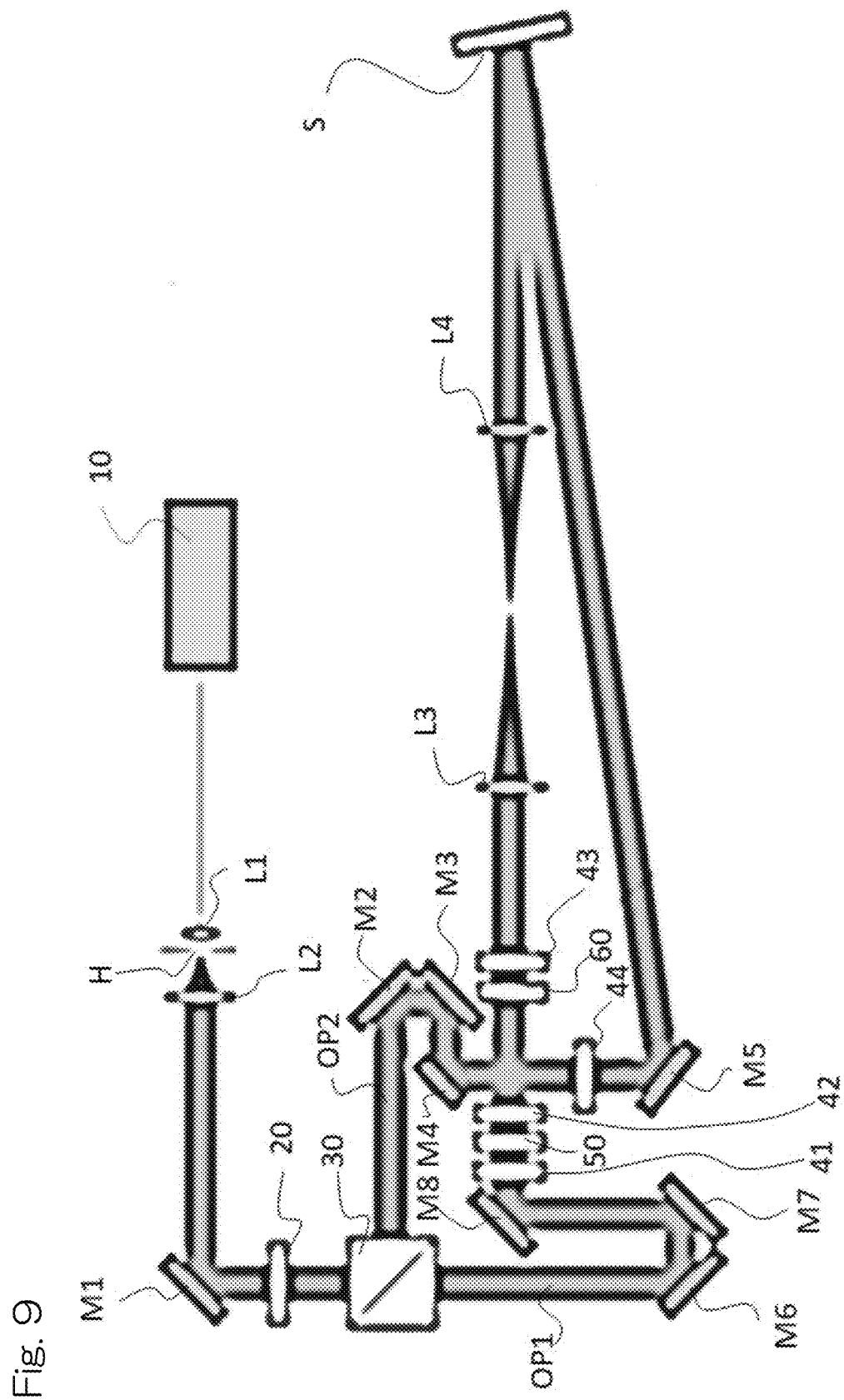
FIG. 9 is a diagram for describing the configuration of an optical system that can be used when recording a hologram in the polarization diffraction element according to the present invention.
Figure 10:
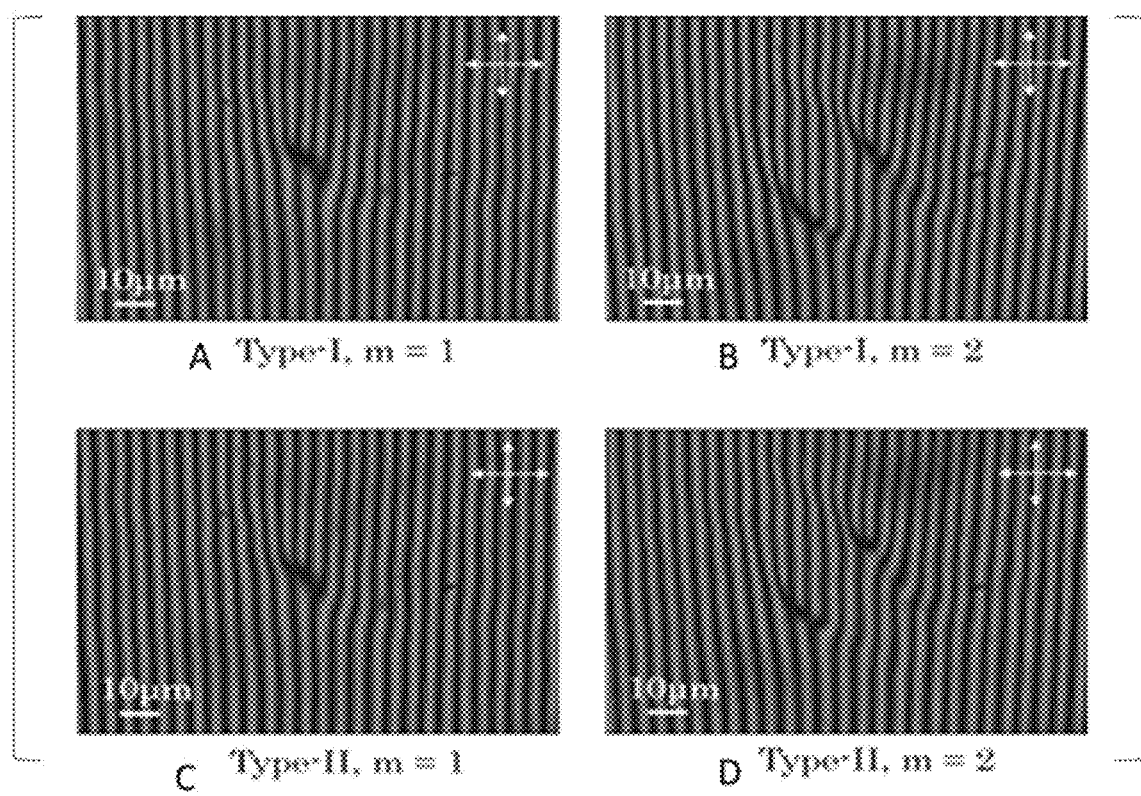
FIG. 10 shows crossed Nicol images of a polarization diffraction element (FPG) produced in Example 1.

FIG. 9 is a top view showing an optical system of an exposure device that can be used to form a hologram in the above described step. In the drawing, M1 to M8 denote total reflection mirrors provided for adjusting the direction of an optical path, and the description thereof is omitted for simplification. The light emitted from a light source 10 passes through lenses L1 and L2, a pinhole H, and through a half-wavelength retardation plate 20, and is then separated by a polarized light beam splitter 30 into p-waves passing through a first optical path OP1 and s-waves passing through a second optical path OP2.

The p-waves pass through a first quarter wavelength retardation plate 41, an axisymmetric half-wavelength retardation plate 50, a second quarter wavelength retardation plate 42, a polarizer 60, and a third quarter wavelength retardation plate 43 that are disposed on the first optical path OP1, and is projected onto a sample (film) S via lenses L3 and L4. Here, a predetermined topological charge is applied by the axisymmetric half-wavelength retardation plate 50, and an optical vortex having circular polarization is projected onto the sample S.

On the other hand, the s-waves pass through a fourth quarter wavelength retardation plate 44 disposed on the second optical path OP2, and is projected onto the sample S as light (Gaussian beam) circularly polarized with a rotation direction reversal to that of the optical vortex having circular polarization. The optical vortex having circular polarization and the interference pattern of circular polarization are recorded as a hologram in the sample S having photosensitivity.

When the above described device is used, by selecting the topological charge to be applied by the axisymmetric half-wavelength retardation plate 50, an FPG of a different type with a different branch number m can be recorded as a hologram in the sample S. By rotating the sample S by a predetermined angle and recording another hologram in the sample S after a predetermined hologram is recorded, a plurality of holograms having different grating vector directions can be multi-recorded in the sample. For example, by recording a hologram each time the sample is rotated by 45°, it is possible to produce a polarization diffraction element in which four types of FPGs, that is, the Type-I FPG with m=1, the Type-I FPG with m=2, the Type II FPG with m=1, and the Type II FPG with m=2, which are described with reference to FIG. 4, are multi-recorded at intervals of 45° in the grating vector direction.

[Liquid Crystalline Material Having Photosensitive Group]

As the liquid crystalline material that has a photosensitive group and that is used in the above production method, for example, it is possible to use a liquid crystalline material comprising at least a polymer that includes a photosensitive group in at least a part of side chains and has a side chain represented by any one of the following chemical formulas 1 to 3.

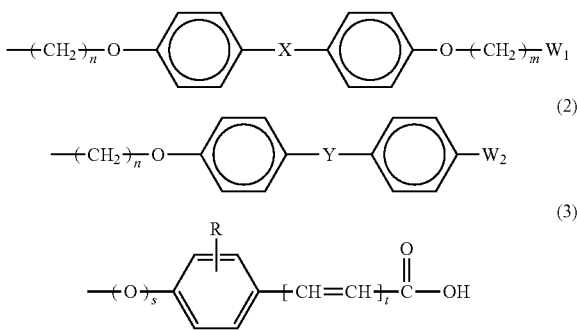

In each of the chemical formulas 1 and 2, n independently represents an integer of 1 to 12, m independently represents an integer of 1 to 12, X and Y each represent none, —COO, —OCO—, —N=N—, —C=C—, or —C$_6$H$_4$—, and W$_1$ and W$_2$ each represent a cinnamoyloxy group, a chalcone group, a cinnamylidene group, a biphenylacryloyloxy group, a furylacryloyloxy group, a naphthylacryloyloxy group or a derivative thereof, —H, —OH, or —CN. In the chemical formula 3, s represents 0 or 1, t represents an integer of 1 to 3, and R represents H, an alkyl group, an alkyloxy group, or a halogen.

When the above liquid crystalline material is used, the side chains having a photosensitive group are oriented perpendicular to the vibration direction of applied polarized light (for example, polarized ultraviolet rays) and the traveling direction of the applied light, and this orientation is performed preferentially from the side chain at a position where orientation is easily performed from a random state. Therefore, when a sample is irradiated with different interference light while changing the angle of the sample, a side chain at a position where orientation is easily performed is oriented upon each irradiation. Even if the liquid crystalline material includes side chains having no photosensitive group, these side chains are oriented according to oriented side chains adjacent thereto in a heating/cooling process, and a hologram is fixed to the sample. Specific steps can be performed under the following conditions.

[Formation of Coating Film]

To a liquid crystalline polymer formed from a monomer unit having a side chain represented by the above chemical formulas 1 to 3, a low molecular weight compound and other components (polymerization catalyst, etc.) are added as necessary. An application solution (coating liquid) is prepared by dissolving these materials in a suitable solvent and is applied onto a support, and the solvent is removed, whereby a liquid crystalline polymer layer can be formed on the support.

Examples of the solvent include dioxane, dichloroethane, cyclohexanone, toluene, tetrahydrofuran, o-dichlorobenzene, methyl ethyl ketone, and methyl isobutyl ketone, and these solvents may be used alone or as a mixture.

The support may be appropriately selected from various polymer films or a glass substrate. Examples of the polymer films include polyethylene terephthalate films, cellulose-based polymer films such as diacetyl cellulose and triacetyl cellulose films, polycarbonate-based polymer films such as bisphenol A-carbonic acid co-polymer films, linear or branched polyolefin films such as polyethylene, polypropylene, and ethylene-propylene co-polymer films, polyamide-based films, imide-based polymer films, and sulfone-based polymer films.

[Formation of Hologram]

After the application solution is applied onto the support and dried to such an extent that the solvent is removed, an optical vortex having circular polarization and an interference image having circular polarization are projected on the coating film, for example, using the device described with reference to FIG. 9, whereby a hologram can be formed. In the case of recording a plurality of holograms in one film, a first hologram is recorded, then, a sample is rotated by a predetermined angle (for example, 45°), and a second hologram is recorded. By repeating this operation, a desired number of (for example, four types of first to fourth) holograms can be multi-recorded. At that time, by replacing the axisymmetric half-wavelength retardation plate 50 and performing individual image formation, it is possible to give different branch numbers m to the formed FPG When changing between Type-I and Type II, adjustment may be performed by the optical system of the device. Alternatively, the sample may be turned over, and an interference image may be formed on the coating film by light incident from the back-surface side (light-permeable substrate side).

Hologram recording may be performed during drying (before completely drying). After the hologram recording, the sample is preferably heated to 80 to 130° C., preferably 100 to 120° C., and cooled.

EXAMPLES

The liquid crystalline material having a side chain represented by the above chemical formula 3 was dissolved in a solvent, and the obtained solution was applied onto a substrate, and the solvent was removed to obtain a sample for hologram recording (sample film). Also, for the materials having side chains represented by the chemical formulas 1 and 2, orientation of side chains can be controlled by ultraviolet light. When these materials are used, the same results as in the following examples can be expected.

Example 1

A polarization hologram was recorded in the sample film using the optical system (hologram recording device) shown in FIG. 9. A DPSS laser was used as a light source. A 360 nm ultraviolet laser light emitted from the light source was spatially separated, while being converted to orthogonal linearly polarized light, by the polarized light beam splitter 30 (the p-wave side is an optical path 1, the s-wave side is an optical path 2). A hologram was formed on the coating film by the interference between an optical vortex having circular polarization formed via the optical path 1 and circularly polarized light formed via the optical path 2. After the hologram was formed, the sample was heated at 135° C. for 3 minutes and then cooled to record the hologram on the coating film. In this example, an axisymmetric half-wavelength retardation plate capable of generating optical vortexes having topological charges m of 1 and 2 was used.

The axisymmetric half-wavelength retardation plate used this time was optimized for 325 nm. The dispersion caused by a deviation from the ideal retardation value was corrected by appropriately arranging the optical axes of the second quarter wavelength retardation plate 42, the third quarter wavelength retardation plate 43, and the polarizer 60. In addition, an axisymmetric half-wavelength plane was imaged on the sample surface by the four-focus optical system shown in FIG. 5 to avoid the influence of expansion of the core part of the optical vortex due to diffraction.

Polarized light micrographs (crossed Nicol arrangements) of four types of FPGs, Type-I (m=1), Type-I (m=2), Type II (m=1), and Type II (m=2), produced by hologram recording are shown in FIGS. 10(a) to (d). It can be seen that the fork-shaped fringes are branched at the center of the element. In each crossed Nicol image, the part where the direction of the optical axis is the direction of the grating vector (the part shown bright in the drawing in FIG. 1) is extinguished and appears dark, and the part where the direction of the optical axis is oblique is bright. Therefore, apparently, the branch number of the fork in the bright part corresponds to twice the value of m. The grating period is about 9 μm.

Figure 11:
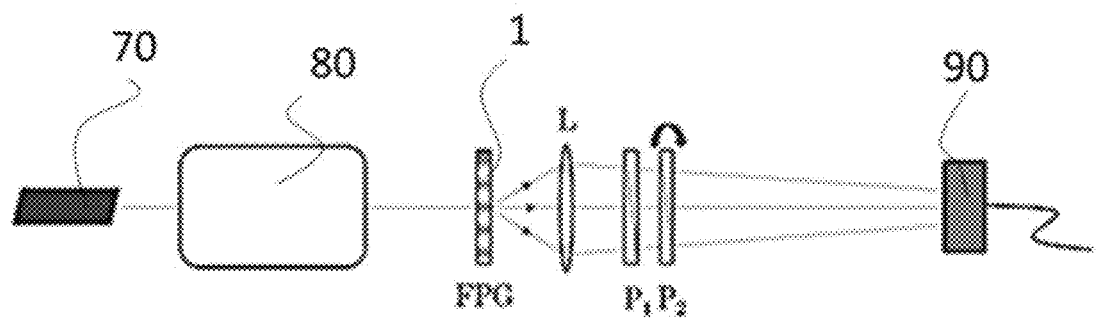
FIG. 11 is a diagram for describing an optical system used to verify the performance of the polarization diffraction element in FIG. 10.
Figure 12:
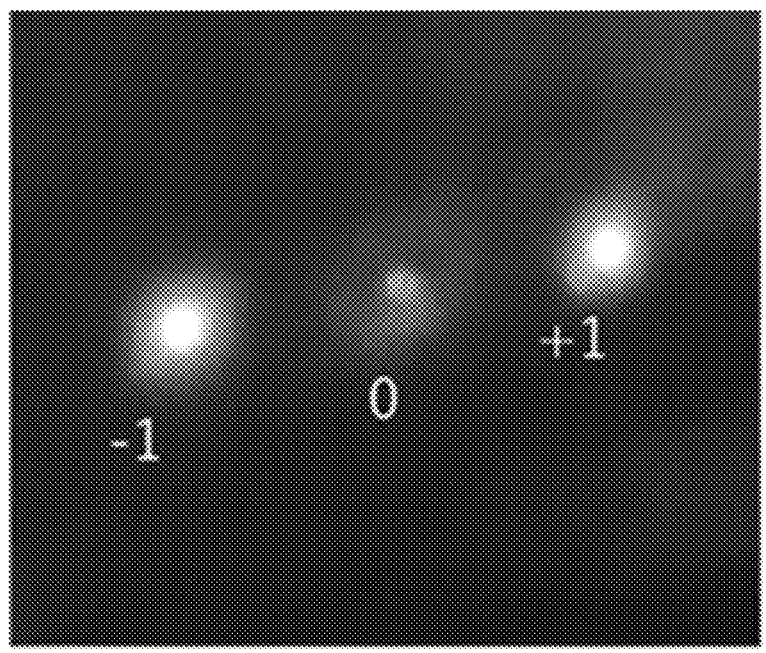
FIG. 12 shows an image of diffraction spots when Gaussian beam with p=0 was transmitted through a polarization diffraction element A in FIG. 10.
Figure 13A:
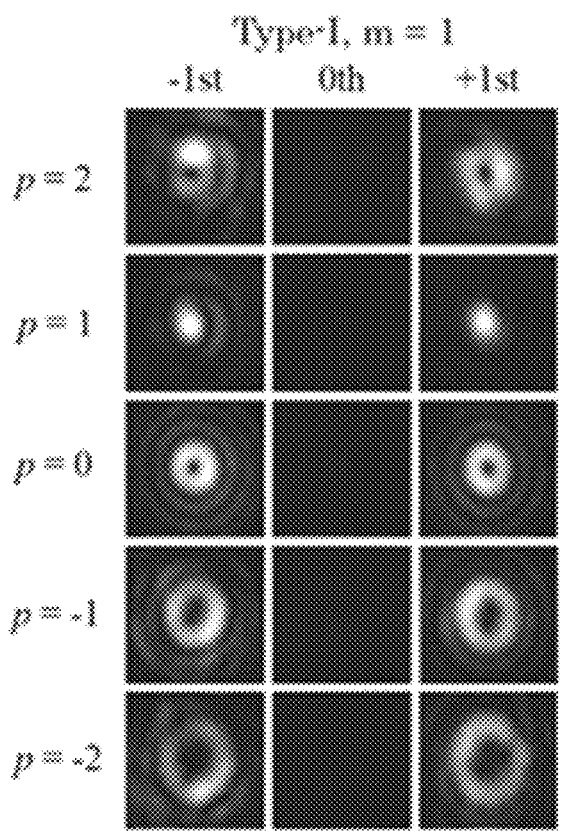
FIGS. 13A to 13D are diagrams showing diffraction images when vector beams having different orders were transmitted through polarization diffraction elements A to D in FIG. 10.
Figure 13B:
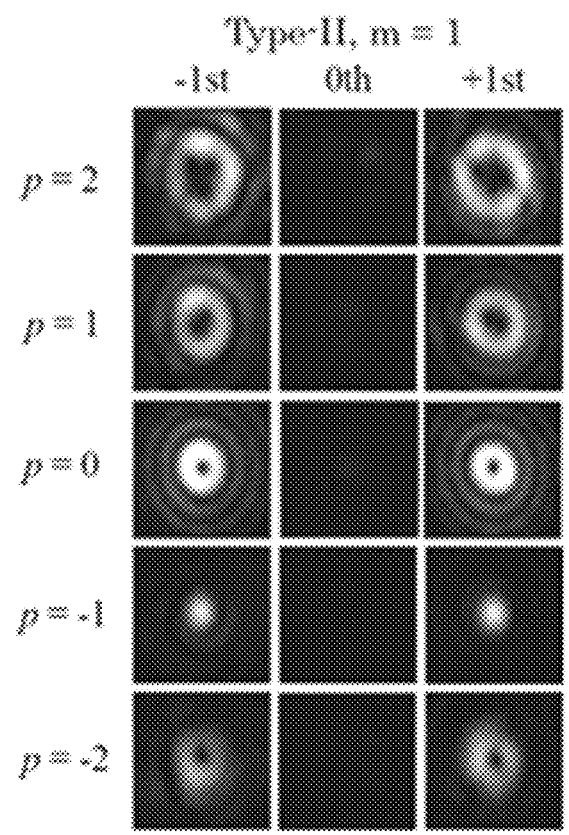
Figure 13C:
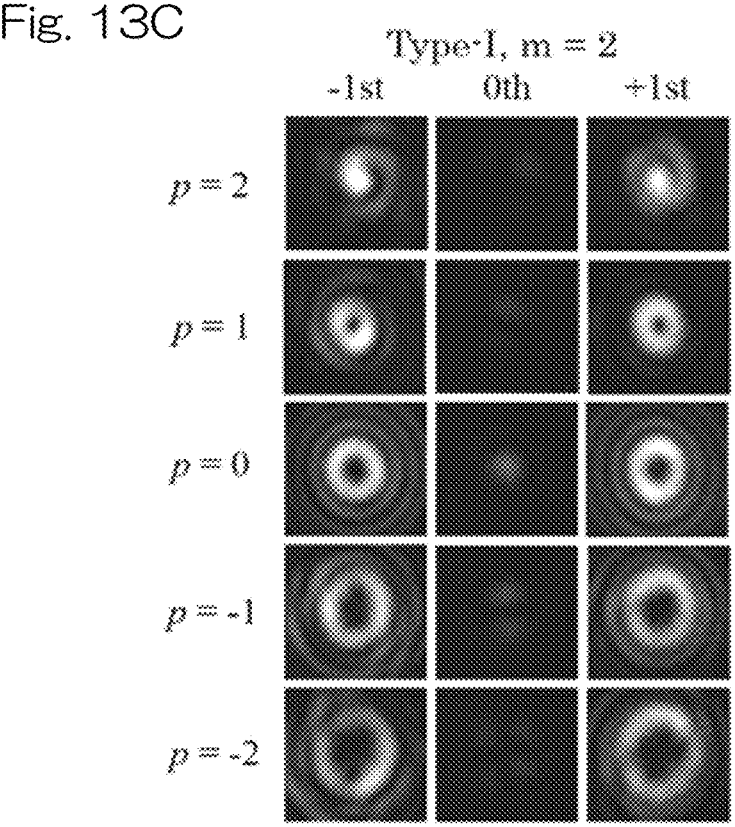
Figure 13D:
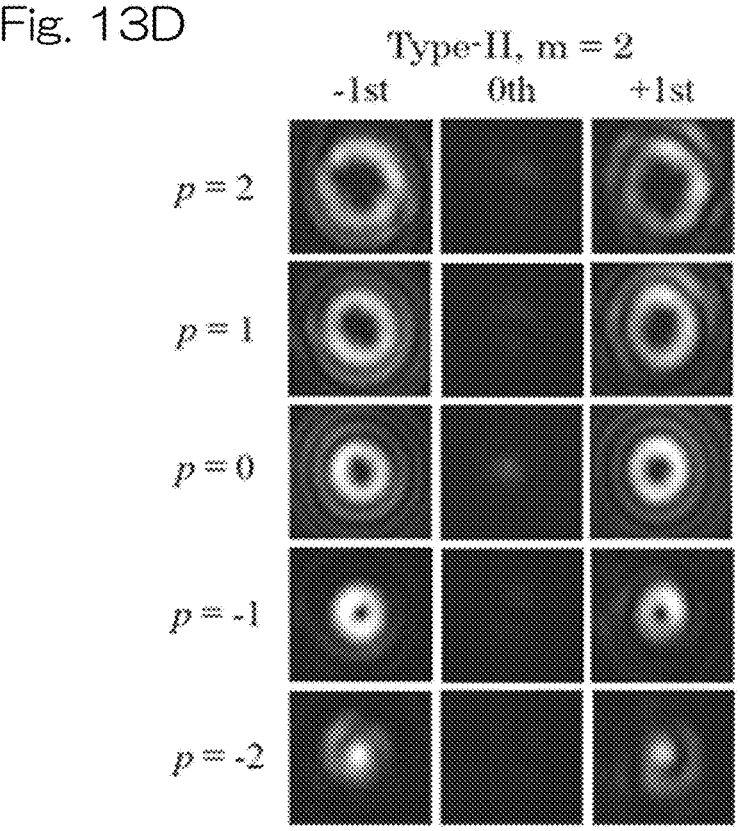

A vector beam (wavelength: 532 nm) generated by using a spatial light modulator was transmitted through the produced FPGs, and a diffraction image was observed. FIG. 11 shows an optical system used in the experiment. Vector beams with p=2, 1, 0, −1, −2 were generated from a vector beam converter 80 including the spatial light modulator and a plurality of types of polarization diffraction elements, using light emitted from an Nd:YAG laser light source 70, and were transmitted through the produced FPGs (polarization diffraction element 1). The FPG-transmitted light was transmitted through a lens L, and a diffraction image was taken on a Fourier surface using a CMOS camera 90. Two polarizers $P_1$ and $P_2$ were disposed behind the lens for adjusting light intensity. FIG. 12 shows an image of diffraction spots when Gaussian beam with p=0 was transmitted through the Type-I (m=1) FPG It is possible to see that three diffraction spots corresponding to +1st-order, 0th-order, and −1st-order were obtained.

FIGS. 13A to 13D show the results of taking diffraction images of light transmitted through various FPGs while changing the p value of the vector beam incident on the FPG It can be seen that the ±1st-order light was converted to Gaussian beam when p=1 with the FPG of [Type-I, m=1], when p=−1 with the FPG of [Type-II, m=1], when p=2 with the FPG of [Type-I, m=2], and when p=−2 with the FPG of [Type-II, m=2]. Therefore, the effectiveness of the principle of mode detection of the present invention was experimentally shown. The diffraction efficiency of each FPG is as shown in Table 1, and it is possible to see that a high diffraction efficiency of 95% or more was obtained for a combination of the ±1st order light.

TABLE 1

| Diffraction Efficiency of Produced FPGs | | | |
|---|---|---|---|
| | −1st-order (%) | 0th-order (%) | 1st-order (%) |
| Type-I, m = 1 | 52 | 3.1 | 43 |
| Type-I, m = 2 | 44 | 1.1 | 54 |
| Type II, m = 1 | 46 | 0.13 | 53 |
| Type II, m = 2 | 53 | 1.0 | 45 |

Example 2

Figure 14:
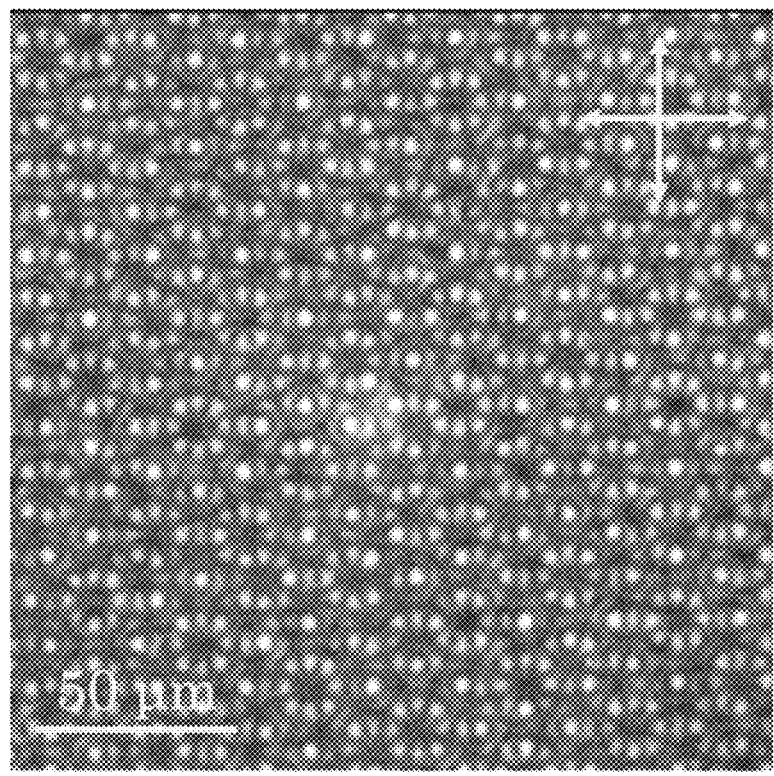
FIG. 14 shows a crossed Nicol image of a polarization diffraction element (Crossed-FPG) produced by multi-recording holograms in Example 2.
Figure 15:
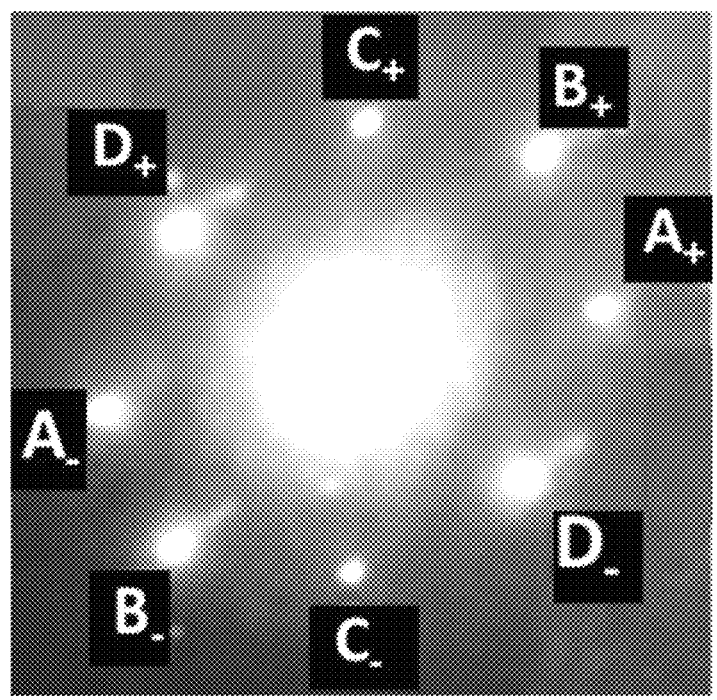
FIG. 15 shows an image of diffraction spots when Gaussian beam with p=0 was transmitted through the polarization diffraction element in FIG. 14.
Figure 16A:
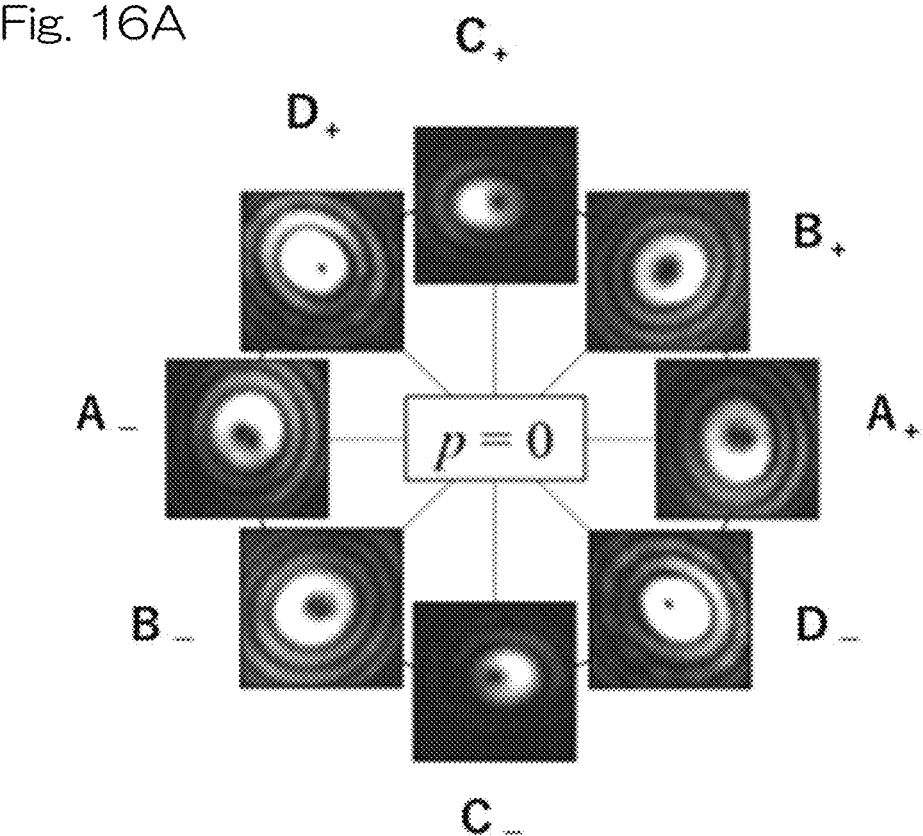
FIGS. 16A to 16E show images showing diffraction images when vector beams having different orders were transmitted through the polarization diffraction element in FIG. 14.
Figure 16B:
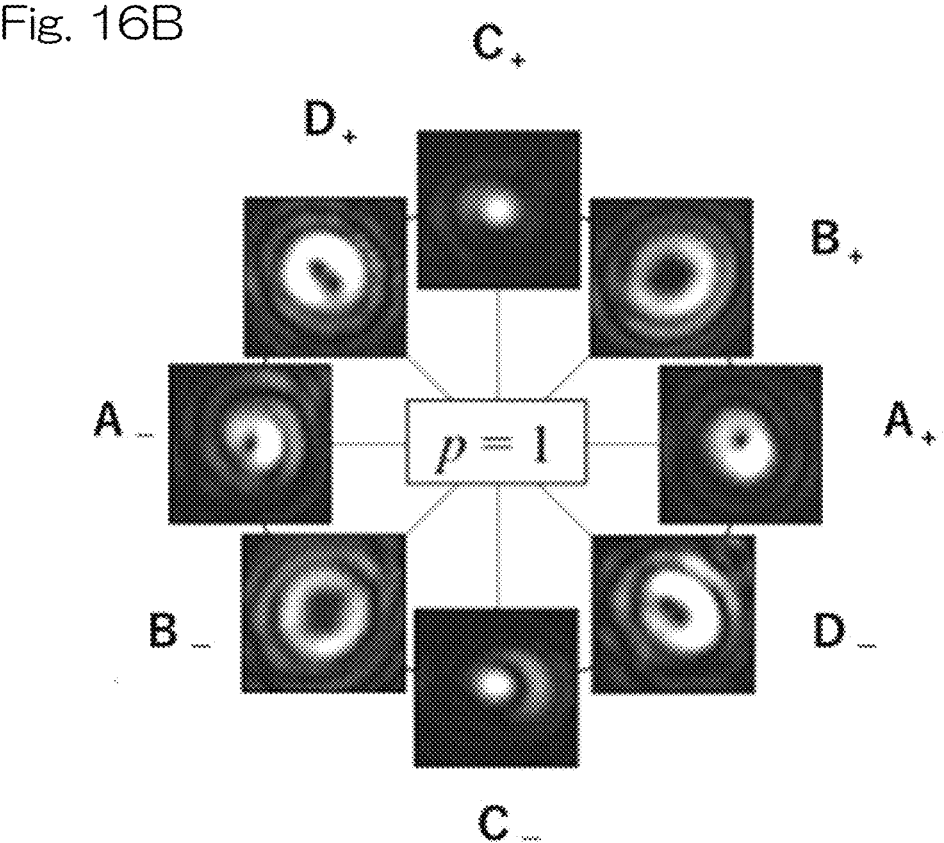
Figure 16C:
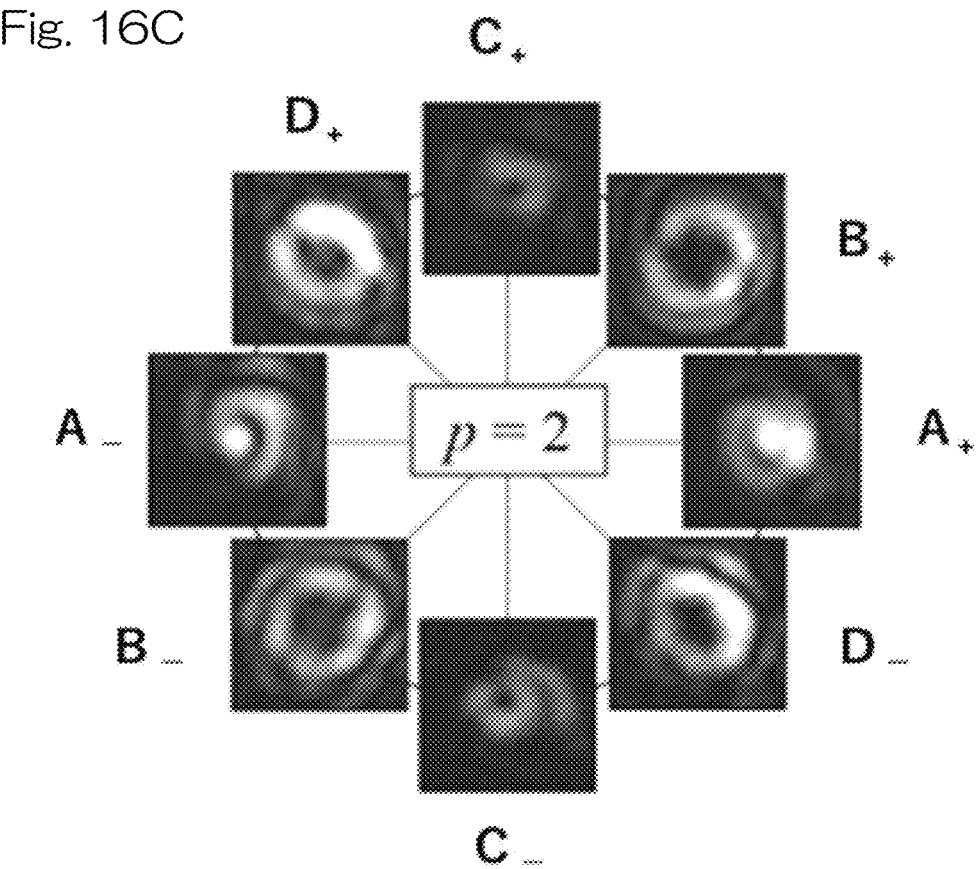
Figure 16D:
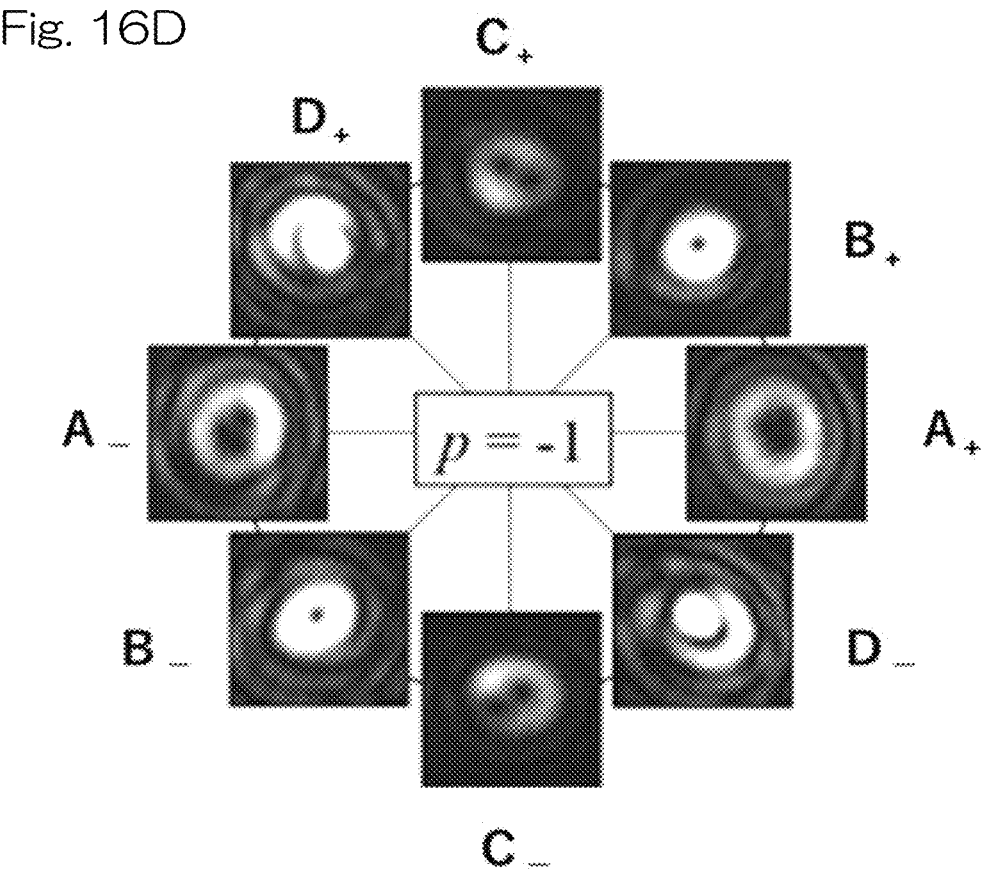
Figure 16E:
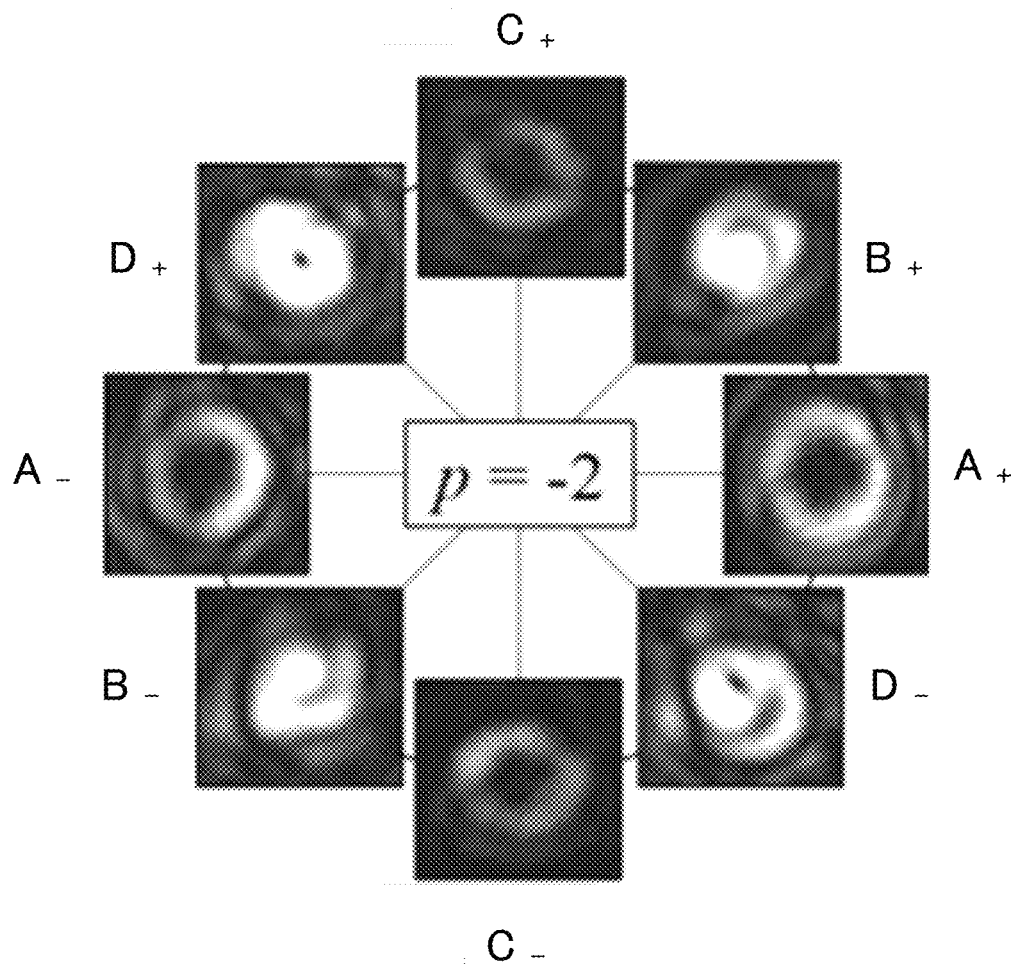

In the above principle, only a vector beam having a certain specific order p can be determined with a single FPG In the actual optical multiplex communication, light in which vector beams having different orders p are multiplexed is incident, and it is necessary to detect the content ratios (mode spectrum) of all the vector beams contained therein. Therefore, multiplexing of the functions of a plurality of types of FPGs was attempted by using the above sample film and overwriting a plurality of types of polarization holograms in one retardation film while changing the direction of a grating vector as described with reference to FIG. 4. FIG. 14 is a polarized light micrograph of a Crossed FPG produced by recording four types of polarization holograms, [Type-I, m=1], [Type-I, m=2], [Type-II, m=1], [Type-I, m=2], while changing the direction of a grating vector in steps of 45°. FIG. 15 shows a diffraction image when Gaussian beam with p=0 was transmitted through the Crossed-FPG It is possible to see that eight diffraction spots were obtained in cylindrical symmetry around 0th-order light. Here, the respective diffraction spots are denoted by $A_+$, $A_-$, $B_+$, $B_-$, $C_+$, C, $D_+$, and $D_-$ as shown in FIG. 15 A, B, C, and D correspond to the grating vector directions the FPGs of [Type-I, m=2], [Type-II, m=2], [Type-I, m=1], and [Type-II, m=1], respectively. FIGS. 16A to 16E show diffraction images when four types of vector beams and Gaussian beam with p=2, 1, 0, −1, and −2 were caused to be separately incident on the Crossed FPG It is possible to see that a Gaussian beam spot was formed when a vector beam that satisfies the condition for mode determination was incident on each FPG in the grating vector direction corresponding to each FPG. Therefore, it was demonstrated that it is possible to determine the modes of a plurality of types of vector beams with a single film, by recording a plurality of types of polarization holograms in a retardation film in which a plurality of types of FPGs functions independently.

The polarization diffraction element according to the present invention can contribute to the realization of optical communication technology using topological light such as vector beam mode detection and multiplexing of vector beams or optical vortexes.

Although the preferred embodiments of the present invention have been described above with reference to the drawings, the present invention is not limited to the above embodiments, and various additions, modifications, or deletions are possible without departing from the scope of the present invention. Accordingly, such additions, modifications, and deletions are, unless they depart from the scope of the present invention as delivered from the claims annexed hereto, to be construed as included therein.

REFERENCE NUMERALS

1 . . . polarization diffraction element
2 . . . single-mode optical fiber
3 . . . photodetector
10 . . . light source
20 . . . half-wavelength retardation plate
30 . . . polarized light beam splitter
41, 42, 43, 44 . . . quarter wavelength retardation plate
50 . . . axisymmetric half-wavelength retardation plate
60 . . . polarizer
70 . . . light source
80 . . . vector beam converter
90 . . . CMOS camera
$P_1, P_2$ . . . polarizer
L1, L2, L3, L4 . . . lens
M1, M2, M3, M4, M5, M6, M7, M8 . . . total reflection mirror
S . . . sample

What is claimed is:

1. A method for generating a vector beam in a multiplex state, the method comprising:
    using a polarization diffraction element; and
    causing an optical vortex having right-handed circular polarization and an optical vortex having left-handed circular polarization to be incident on the polarization diffraction element from ±1st-order diffraction directions of the plurality of polarization holograms, and coherently superimposing the optical vortexes, thereby emitting a multiplex vector beam in which vector beams having different modes are multiplexed,
wherein
the polarization diffraction element comprises
    a film including a liquid crystalline material having photosensitivity,
    the film having a plurality of polarization at least one holograms recorded therein,
    wherein each of the polarization holograms has a property as a fork-shaped polarization grating having an anisotropic structure in which an optical axis continuously rotates toward a direction of a grating vector, and the direction of the grating vector and a topological charge applied to diffracted light are different from each other.

2. A method for detecting an optical vortex/polarization multiplex state, the method comprising:
    detecting a combination state of a mode of an optical vortex and a rotation direction of circularly polarized light on the basis of a topological charge applied to light incident on a polarization diffraction element,
wherein
the polarization diffraction element comprises
    a film including a liquid crystalline material having photosensitivity,
    the film having a plurality of polarization at least one holograms recorded therein,
    wherein each of the polarization holograms has a property as a fork-shaped polarization grating having an anisotropic structure in which an optical axis continuously rotates toward a grating vector, and the direction of the grating vector and a topological charge applied to diffracted light are different from each other.

3. A method for generating a vector beam in a multiplex state, the method comprising:
    using a polarization diffraction element; and
    causing an optical vortex having right-handed circular polarization and an optical vortex having left-handed circular polarization to be incident on the polarization diffraction element from ±1st-order diffraction directions of the plurality of polarization holograms, and coherently superimposing the optical vortexes, thereby emitting a multiplex vector beam in which vector beams having different modes are multiplexed,
wherein
the polarization diffraction element comprises
    a film including a liquid crystalline material having photosensitivity,
    the film having a plurality of polarization holograms recorded therein,
    wherein each of the polarization holograms has a property as a fork-shaped polarization grating having an anisotropic structure in which an optical axis continuously rotates toward a direction of a grating vector, and the direction of the grating vector and a topological charge applied to diffracted light are different from each other,
    wherein the liquid crystalline material of the film of the polarization diffraction element comprises at least a polymer that includes a photosensitive group in at least a part of side chains and that has a side chain represented by any one of the following chemical formulas 1 to 3, (1)
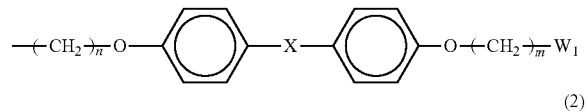

(2)
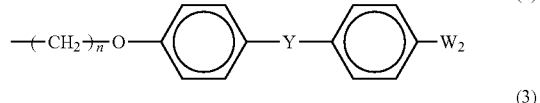

(3)
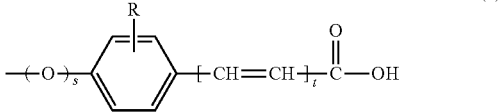

wherein, in each of the chemical formulas 1 and 2, n independently represents an integer of 1 to 12, m independently represents an integer of 1 to 12, X and Y each represent none, —COO—, —OCO—, —N=N—, —C=C—, or —$C_6H_4$—, and $W_1$ and $W_2$ each represent a cinnamoyloxy group, a chalcone group, a cinnamylidene group, a biphenylacryloylosy group, a furylacryloyloxy group, a naphthylacryloyloxy group or a derivative thereof, —H, —OH, or —CN, and, in the chemical formula 3, s represents 0 or 1, t represents an integer of 1 to 3, and R represents H, an alkyl group, an alkyloxy group, or a halogen.

4. A method for detecting an optical vortex/polarization multiplex state, the method comprising:
    detecting a combination state of a mode of an optical vortex and a rotation direction of circularly polarized light on the basis of a topological charge applied to light incident on a polarization diffraction element,
wherein
the polarization diffraction element comprises
a film including a liquid crystalline material having photosensitivity,
the film having a plurality of polarization holograms recorded therein,
wherein each of the polarization holograms has a property as a fork-shaped polarization grating having an anisotropic structure in which an optical axis continuously rotates toward a direction of a grating vector, and the direction of the grating vector and a topological charge applied to diffracted light are different from each other,
wherein the liquid crystalline material of the film of the polarization diffraction element comprises at least a polymer that includes a photosensitive group in at least a part of side chains and that has a side chain represented by any one of the following chemical formulas 1 to 3,

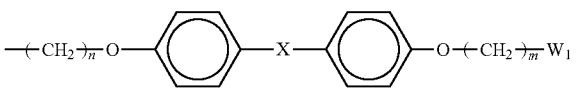
(1)

(2)

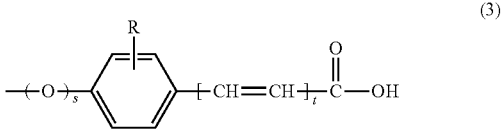
(3)

wherein, in each of the chemical formulas 1 and 2, n independently represents an integer of 1 to 12, m independently represents an integer of 1 to 12, X and Y each represent none, —COO—, —OCO—, —N=N—, —C=C—, or —$C_6H_4$—, and $W_1$ and $W_2$ each represent a cinnamoyloxy group, a chalcone group, a cinnamylidene group, a biphenylacryloylosy group, a furylacryloyloxy group, a naphthylacryloyloxy group or a derivative thereof, —H, —OH, or —CN, and, in the chemical formula 3, s represents 0 or 1, t represents an integer of 1 to 3, and R represents H, an alkyl group, an alkyloxy group, or a halogen.

* * * * *

UNITED STATES PATENT AND TRADEMARK OFFICE
CERTIFICATE OF CORRECTION

PATENT NO. : 12,055,742 B2
APPLICATION NO. : 17/014620
DATED : August 6, 2024
INVENTOR(S) : Takeya Sakai et al.

Page 1 of 1

It is certified that error appears in the above-identified patent and that said Letters Patent is hereby corrected as shown below:

On the Title Page

Item (57) "A polarization diffraction element comprising including a film" should be --A polarization diffraction element including a film--

Signed and Sealed this
Tenth Day of June, 2025

Coke Morgan Stewart
*Acting Director of the United States Patent and Trademark Office*